US006485387B1

(12) United States Patent
Goodnight et al.

(10) Patent No.: US 6,485,387 B1
(45) Date of Patent: Nov. 26, 2002

(54) APPARATUS AND METHOD FOR DETERMINING THE OUTPUT SPEED OF A HYDROSTATIC UNIT IN A HYDRO-MECHANICAL TRANSMISSION

(75) Inventors: Trent Lynn Goodnight, Hudson; Douglas Rene Johnson, Waterloo; David D. Dirks, Ames, all of IA (US); Wilhelm Göllner, Neumünster (DE)

(73) Assignee: Deere & Company, Moline, IL (US)

(*) Notice: Subject to any disclaimer, the term of this patent is extended or adjusted under 35 U.S.C. 154(b) by 20 days.

(21) Appl. No.: 09/669,762

(22) Filed: Sep. 26, 2000

(51) Int. Cl.[7] .............................................. F16H 47/06
(52) U.S. Cl. .......................................... 475/76; 475/82
(58) Field of Search ............................. 475/76, 80, 81, 475/82, 72

(56) References Cited

U.S. PATENT DOCUMENTS

| 4,446,756 | A | * | 5/1984 | Hgin et al. ................... 475/75 |
| 4,519,274 | A | * | 5/1985 | Maruyama et al. ........ 475/76 X |
| 4,976,664 | A | * | 12/1990 | Hagin et al. ................... 475/80 |
| 5,682,315 | A | * | 10/1997 | Coutant et al. ............ 475/76 X |
| 5,684,694 | A | * | 11/1997 | Ishino et al. .............. 475/76 X |
| 5,980,411 | A | * | 11/1999 | Wontner ....................... 475/76 |
| 5,997,426 | A | * | 12/1999 | Ito et al. ........................ 475/80 |

FOREIGN PATENT DOCUMENTS

JP 03140657 * 6/1991 ................... 475/73

* cited by examiner

*Primary Examiner*—Rodney H Bonck
*Assistant Examiner*—Ha Ho

(57) ABSTRACT

The output speed of a hydrostatic unit in a transmission is determined using a pair of variable reluctance sensors, one on a gear driven by the hydrostatic unit output and the other on the carrier of the planetary system. One of the two sensors will always be measuring a relatively high speed from which the hydro output is directly determined or indirectly determined using the current engine speed. Thus the frequency of the speed sensor used to determine the hydrostatic unit output speed is not decreased at slow hydrostatic unit output speeds.

14 Claims, 2 Drawing Sheets

APPARATUS AND METHOD FOR DETERMINING THE OUTPUT SPEED OF A HYDROSTATIC UNIT IN A HYDRO-MECHANICAL TRANSMISSION

BACKGROUND OF THE INVENTION

1. Field of the Invention

The present invention relates to a hydro-mechanical transmission having a hydrostatic unit and in particular to a method and means for determining the actual output speed of the hydrostatic unit.

2. Description of Related Art

The controller of a hydro-mechanical transmission commands a given output speed for the hydrostatic unit based on a variety of input factors. For proper control it is necessary to have a feedback to the controller of the actual output speed of the hydrostatic unit. This has been provided in the past by the use of a directional Hall effect sensor and a magnetic ring carried on the hydro unit output shaft or on a gear driven by the hydro unit output shaft. One drawback of this approach is that the directional Hall effect sensors and the magnetic ring are relatively expensive. Another drawback is that when the hydrostatic unit is at near zero stroke, the hydro unit output speed is low and the frequency of the speed pulses is also low. Therefore, the update rate for measuring the hydro unit output speed is slow.

SUMMARY OF THE INVENTION

It is therefore an object of the present invention to overcome the above drawbacks associated with the use of a directional Hall effect speed sensor.

The transmission of the present invention uses two, non-directional, relatively inexpensive variable reluctance speed sensors on different gears in the transmission to accurately determine the speed and direction of the hydrostatic unit output. One sensor is on the hydro unit output of the hydrostatic unit and measures the hydro unit output speed directly. The other sensor is on the transmission planetary carrier and measures the hydro unit output speed indirectly. The hydro unit output speed must be calculated based on the current engine speed and the known transmission gear ratios. When the hydrostatic unit is stopped or turning at a slow speed, the carrier is turning at a relatively fast speed. Furthermore, when the carrier is stopped or turning at a slow speed, the hydrostatic unit output shaft is turning at a relatively fast speed. The sensor that is measuring the faster actual speed is the sensor that is used to determine the hydro unit output speed. There is a transition period during which the two measured speeds are relatively close to one another. In the transition period, the hydro unit output speeds determined by the two sensors are averaged and the average value used by the controller as the hydro unit output speed.

By using the sensor with the highest actual speed measurement, the frequency of the speed measurement is always greater than or equal to 250 Hz. As a result, a new and accurate speed can be measured every 4 ms for closed loop speed control. The variable reluctance sensors are inexpensive and can measure existing gears in the transmission without the need for a pressed-on magnetic ring. Furthermore, having two sensors to measure the hydrostatic unit speed allows for error checking and onboard diagnostics by the controller.

DESCRIPTION OF THE PREFERRED EMBODIMENT

Figure 1:
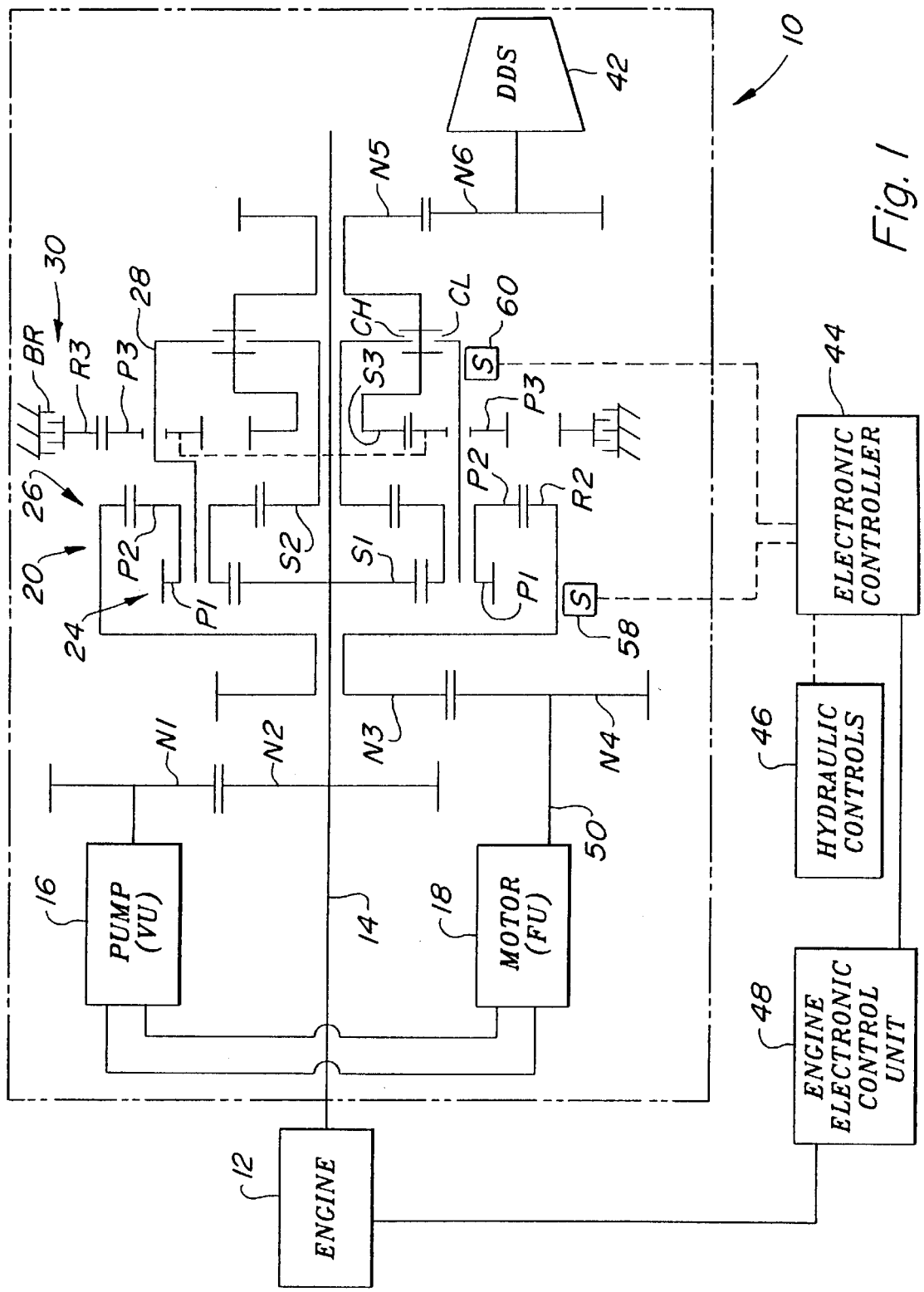
FIG. 1 is a schematic of the hydro-mechanical transmission of the present invention.

The hydro-mechanical transmission of the present invention is shown in FIG. 1 and designated generally at 10. The transmission 10 is adapted to be driven by an engine 12 having an output shaft 14. The transmission further includes a hydrostatic unit including a variable speed pump 16 and a motor 18 driven by the pump 16. The engine output shaft 14 drives the hydrostatic pump 16 through gears N2 and N1.

The transmission includes a planetary system 20 having first and second planetary gear sets 24 and 26. The planetary gear sets have a common planetary carrier 28 that carries the integral planet gears P1 and P2 of the two planetary gear sets respectively. A single ring gear R2 is provided that meshes with the planet gears P2. The engine output shaft 14 also drives the sun gear S1 of the first planetary gear set 24. The second planetary gear set 26 has a sun gear S2.

The transmission includes two clutches, a low range clutch CL and a high range clutch CH. The clutch CL is engagable to couple the carrier 28 to the differential drive shaft 42 through the gears N5 and N6. The clutch CH is engagable to couple the sun gear S2 to the differential drive shaft 42 through the gears N5 and N6. The transmission also includes a reversing planetary gear set 30 having a ring gear R3, planet gears P3 and a sun gear S3. When the brake BR is engaged to stop the rotation of the ring gear R3 and the two clutches are disengaged, S3 will rotate in the opposite direction, thereby changing the direction of rotation of the drive shaft 42.

The transmission includes an electronic controller 44 that communicates with the hydraulic controls 46 to operate the transmission 10. The hydraulic controls are used to control the output of the hydrostatic variable unit 16 as well as to engage and disengage the clutches CL, CH and the brake BR in the transmission. The controller 44 also communicates with the engine electronic control unit 48 to coordinate the control of the engine 12 and the transmission 10. The transmission controller 44 receives, among other things, an input from the engine electronic control unit 48 regarding the speed of the engine which is the speed of the sun gear S1.

The electronic controller 44 commands a speed for the hydro unit output shaft 50 that drives the gear N4. In order to control the transmission, it is necessary to have a closed loop speed control system in which the actual speed of the hydro unit output shaft 50 is provided to the controller 44.

A first variable reluctance speed sensor 58 measures the speed of the ring gear R2 which is driven by the hydro unit output through the gears N3 and N4. The speed of R2 is directly proportional to the hydro unit output speed. Alternatively, the sensor 58 can be located to measure the speed of the gear N4 on the hydro unit output shaft. The sensor 58 provides a direct measure of the hydro unit output speed.

A second variable reluctance speed sensor 60 measures the speed of the planetary carrier 28. This is an indirect measure of the hydro unit output speed as the electronic controller 44 must calculate the hydro unit output speed from the carrier speed and the speed of sun gear S1. The hydro unit output speed is calculated by the following equation:

$$\text{Hydro speed} = \{([(P2*S1)+(P1*R2)]*[\text{carrier speed}]-[P2*S1*(\text{speed } S1)])/(P1*R2)\}*\{-N4/N\}$$

Where P1, S1, etc. represent the number of teeth on the respective gears. The resulting value will be either positive or negative, thus indicating the direction of rotation of the hydro unit output. This equation can be used at all times to determine the direction of the hydro output even when the hydro unit output speed is determined by the sensor 58 on the ring gear R2.

Figure 2:
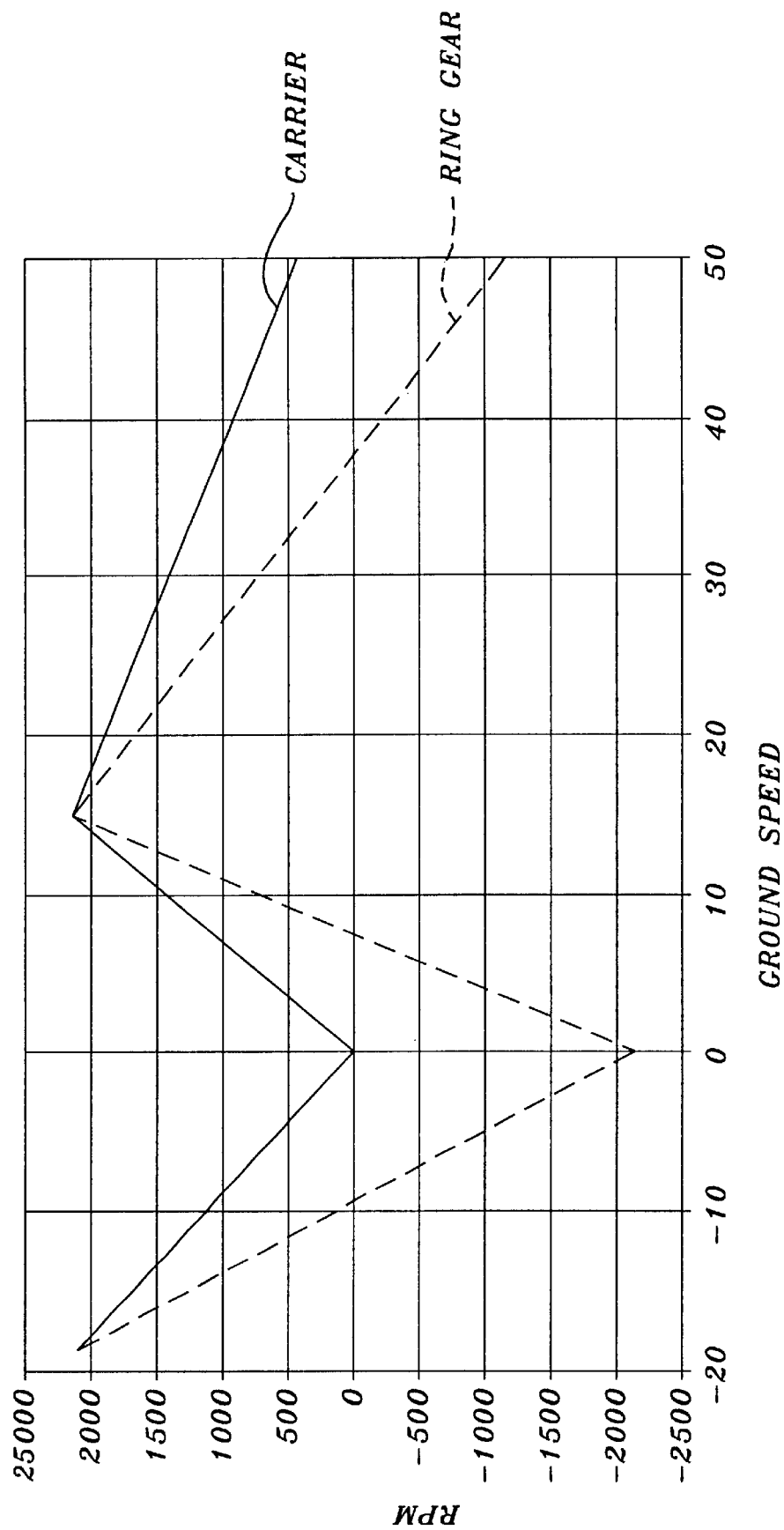
FIG. 2 is a graph showing the ring gear speed and the planet carrier speed versus vehicle ground speed.

With reference to FIG. 2, the speed of the carrier and the speed of the ring gear R2 are shown in relation to the vehicle ground speed. As can be seen, neither the carrier speed nor the ring gear speed are at zero or close to zero at the same ground speed. One of the two is always turning at a speed fast enough to give the needed measurement frequency for the hydro unit output. Whichever sensor of the two sensors 58, 60 is measuring the fastest actual speed is the sensor used to determine the measured hydro unit output speed. When the two speeds actually measured by the sensors are close to the same, e.g. within 10 percent of one another, the hydro unit output speeds as determined by both of the two sensors are averaged together. The averaged value is used by the controller as the hydro unit output speed.

By using two magnetic sensors instead of the single directional Hall effect sensor, the frequency of the speed measurement is always greater than 250Hz even when the hydrostatic unit is stopped or near stopped.

It is preferred to use the carrier for the indirect measure of the hydro unit output speed. However, other components of the transmission driven by the planetary gear set 24 can be used in this measurement. For example, the speeds of sun gears S2 or S3 could be measured and the hydro unit output speed calculated therefrom. Depending on which element is used, clutch slippage may be a complicating factor. This is why the carrier speed is preferred, since clutch slippage is not a factor in calculating the hydro unit output speed.

The invention should not be limited to the above-described embodiment, but should be limited solely by the claims that follow.

What is claimed is:

1. A hydro-mechanical transmission adapted to be driven by an engine comprising:
   a variable speed hydrostatic unit having a pump and a motor with a hydrostatic unit output shaft whereby the hydrostatic unit output shaft speed is variable;
   a planetary system having first and second planetary gear sets, the first planetary gearset having a sun gear (S1) adapted to be driven by the engine, planet gears (P1) and a planet carrier while the second planetary gearset includes a ring gear (R2) driven by the hydrostatic unit output shaft, a sun gear (S2) and planet gears (P2) integral with the planet gears (P1) and carried by the planet carrier, whereby the carrier speed is a function of the speed of the sun gear (S1) and the speed of the ring gear (R2);
   the transmission further having a reversing planetary gearset having a sun gear (S3) driving a transmission output shaft and planet gears (P3) carried by the planet carrier and a pair of clutches including a low range clutch (CL) and a high range clutch (CH), the clutches (CL), (CH) being selectively engagable to connect the carrier or the sun gear (S2), respectively, to the output shaft;
   an electronic transmission controller that commands a desired hydrostatic unit output shaft speed; and
   a pair of transmission speed sensors providing feedback to the controller of the hydrostatic unit output shaft speed, the first sensor of the pair directly measuring the speed of the hydrostatic unit output shaft and the second sensor indirectly measuring the speed of the hydrostatic unit output shaft by measuring the speed of a transmission element driven by the first planetary gear set from which the speed of the hydrostatic unit output shaft can be determined based on the speed of sun gear (S1) and gear ratios of the gears.

2. The transmission as defined by claim 1 wherein the second sensor measures the speed of the carrier.

3. The transmission as defined by claim 2 further comprising a first gear (N3) and a second gear (N4), wherein the hydrostatic unit output speed is calculated from the carrier speed and speed of the sun gear (S1) by the equation:

$$\text{Hydro speed} = \{([(P2*S1)+(P1*R2)]*[\text{carrier speed}]-[P2*S1*(S1 \text{ speed})])/(P1*R2)\}*\{-N4/N3\}$$

where P1, S1, R2, P2, N3 and N4 represent the number of teeth on the respective gears.

4. The transmission as defined by claim 1 wherein the first sensor measures the speed of the ring gear (R2) from which the speed of the hydrostatic unit is determined by a known gear ratio.

5. A hydro-mechanical transmission adapted to be driven by an engine comprising:
   a variable speed hydrostatic unit having a pump and a motor with a hydrostatic unit output shaft whereby the hydrostatic unit output shaft speed is variable;
   a planetary system having a sun gear adapted to be driven by the engine, a ring gear driven by the hydrostatic unit output shaft of the hydrostatic unit and planet gears mounted to a planetary carrier whereby the carrier speed is a function of the sun gear speed and the ring gear speed;
   an electronic transmission controller that commands a desired hydrostatic unit output shaft speed; and
   a pair of transmission speed sensors providing feedback to the controller of the hydrostatic unit output shaft speed, the first sensor of the pair directly measuring the speed of the hydrostatic unit output shaft and the second sensor indirectly measuring the speed of the hydrostatic unit output shaft by measuring the speed of the planetary carrier from which the speed of the hydrostatic unit output shaft is calculated based on the current engine speed.

6. The transmission as defined by claim 5 wherein the controller determines the speed of the hydrostatic unit output shaft from the sensor of the pair of sensors that is currently measuring the higher actual speed.

7. The transmission as defined by claim 5 wherein the controller determines the speed of the hydrostatic unit output shaft by averaging the hydrostatic unit output shaft speeds as determined from the feedback of the two sensors.

8. The transmission as defined by claim 5 wherein the controller determines the speed of the hydrostatic unit output shaft by averaging the hydrostatic unit output shaft speeds as determined from the feedback of the two sensors when the speed signals generated by the two sensors are within a predetermined range of one another.

9. The transmission as defined by claim 5 wherein the sensors are variable reluctance speed sensors.

10. The transmission as defined by claim 5 further comprising a hydraulic controller receiving control inputs from the electronic controller.

11. The transmission as defined by claim 5 wherein the electronic controller receives an engine speed signal from an electronic engine control unit.

12. The transmission as defined by claim 4 wherein the first sensor measures the speed of a gear driven by the hydrostatic unit output shaft from which the hydrostatic unit output shaft speed is determined.

13. A method of determining the actual speed of a hydrostatic unit output shaft in a hydro-mechanical transmission adapted to be driven by an engine, the transmission including a variable speed hydrostatic unit having a pump and a motor with a hydrostatic unit output shaft whereby the hydrostatic unit output shaft speed is variable, a planetary system having a sun gear adapted to be driven by the engine, a ring gear driven by the output shaft of the hydrostatic unit and planet gears mounted to a planetary carrier whereby the carrier speed is a function of the sun gear speed and the ring gear speed and an electronic transmission controller that commands a desired hydrostatic unit output shaft speed, the method of determining the actual speed comprising the steps of:

providing a first sensor for measuring the speed of a component whose speed is directly proportional to the speed of the hydrostatic unit output shaft, the first sensor generating a signal to the controller indicative of the measured speed;

providing a second sensor for measuring the speed of the planetary carrier and generating a signal to the controller indicative of the planetary carrier speed from which the hydrostatic unit output shaft speed can be determined based on the engine speed and the gear ratio of the planetary system; and selecting as the hydrostatic unit output shaft speed the speed determined from the sensor that is producing a signal indicating the higher actual speed measurement.

14. The method as defined by claim 13 wherein the hydrostatic unit output shaft speeds determined from the signals of the two sensors are averaged when the actual speed measurements of the two sensors are within a predetermined range of one another.

* * * * *

UNITED STATES PATENT AND TRADEMARK OFFICE
CERTIFICATE OF CORRECTION

PATENT NO. : 6,485,387 B1
DATED : November 26, 2002
INVENTOR(S) : Goodnight et al.

It is certified that error appears in the above-identified patent and that said Letters Patent is hereby corrected as shown below:

<u>Title page,</u>
Item [73], Assignee, should read:
-- Deere & Company, Moline, IL (US)
  Sauer-Danfoss Company, Ames, IA (US) --

Signed and Sealed this

Fifteenth Day of April, 2003

JAMES E. ROGAN
*Director of the United States Patent and Trademark Office*